(12) United States Patent
Chen et al.

(10) Patent No.: US 10,996,197 B2
(45) Date of Patent: May 4, 2021

(54) COLLECTION SURFACE FOR ELECTRODES IN PHOTOIONIZATION DETECTOR

(71) Applicant: HONEYWELL INTERNATIONAL INC., Morris Plains, NJ (US)

(72) Inventors: Bo Chen, Morris Plains, NJ (US); Qidao Lin, Morris Plains, NJ (US); Guangli Xie, Morris Plains, NJ (US); Zhanghua Wu, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 69 days.

(21) Appl. No.: 16/471,178

(22) PCT Filed: Dec. 20, 2016

(86) PCT No.: PCT/CN2016/110988
§ 371 (c)(1),
(2) Date: Jun. 19, 2019

(87) PCT Pub. No.: WO2018/112732
PCT Pub. Date: Jun. 28, 2018

(65) Prior Publication Data
US 2020/0025716 A1    Jan. 23, 2020

(51) Int. Cl.
*G01N 27/66* (2006.01)
(52) U.S. Cl.
CPC .................. *G01N 27/66* (2013.01)
(58) Field of Classification Search
CPC ...................................................... G01N 27/66
(Continued)

(56) References Cited

U.S. PATENT DOCUMENTS

| 4,266,196 A | * | 5/1981 | Kawazoe | G01N 27/66 313/231.71 |
| 4,385,830 A | * | 5/1983 | Webb | G01P 5/01 356/28 |

(Continued)

FOREIGN PATENT DOCUMENTS

| CN | 101308125 A | 11/2008 |
| CN | 201514403 U | 6/2010 |

(Continued)

OTHER PUBLICATIONS

International Search Report and Written Opinion for Application No. PCT/CN2016/110988, dated Aug. 24, 2017, 7 pages.

*Primary Examiner* — Tung X Nguyen
*Assistant Examiner* — Robert P Alejnikov, Jr.
(74) *Attorney, Agent, or Firm* — Alston & Bird LLP

(57) ABSTRACT

Embodiments relate generally to systems and methods for shielding electrodes (204,205,504,505) within a photoionization detector (100). A photoionization detector (100) may comprise an ultraviolet radiation source (130); one or more detector electrodes (204,205,504,505); one or more collection surfaces (224,225,524,525) extending vertically from the detector electrodes (204,205,504,505); and a shielding material (206,506) located between the ultraviolet radiation source (130) and the one or more detector electrodes (204, 205,504,505), wherein the ultraviolet radiation (130) does not directly impinge on at least a portion of the one or more detector electrodes (204,205,504,505). The one or more collection surfaces (224,225,524,525) may comprise a surface area that is not covered by the shielding material (206,506).

15 Claims, 5 Drawing Sheets

(58) Field of Classification Search
USPC .......................................................... 324/464
See application file for complete search history.

(56) References Cited

U.S. PATENT DOCUMENTS

| | | | | |
|---|---|---|---|---|
| 4,703,173 A * | 10/1987 | Wood | ........................ | G01J 1/04 |
| | | | | 250/227.32 |
| 6,081,325 A * | 6/2000 | Leslie | .................... | G01N 21/94 |
| | | | | 356/237.2 |
| 6,225,633 B1 * | 5/2001 | Sun | ........................ | G01N 27/66 |
| | | | | 250/281 |
| 6,313,638 B1 * | 11/2001 | Sun | ........................ | G01N 27/66 |
| | | | | 324/464 |
| 8,311,069 B2 * | 11/2012 | Dantus | .................. | H01S 3/0057 |
| | | | | 372/25 |
| 2005/0110986 A1 * | 5/2005 | Nikoonahad | ...... | G01N 21/9501 |
| | | | | 356/237.2 |
| 2005/0218334 A1 * | 10/2005 | Haverstick | ............. | G01N 27/66 |
| | | | | 250/423 P |
| 2010/0171504 A1 * | 7/2010 | Nichiporov | ............. | G01T 1/185 |
| | | | | 324/464 |
| 2015/0377844 A1 * | 12/2015 | Horiike | .................. | G01N 27/70 |
| | | | | 73/23.4 |
| 2018/0033769 A1 * | 2/2018 | Wang | ..................... | H04N 5/332 |

FOREIGN PATENT DOCUMENTS

| | | |
|---|---|---|
| CN | 203376288 U | 1/2014 |
| CN | 105675710 A | 6/2016 |
| EP | 0995989 A1 | 4/2000 |

\* cited by examiner

COLLECTION SURFACE FOR ELECTRODES IN PHOTOIONIZATION DETECTOR

CROSS-REFERENCE TO RELAYED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Photoionization detectors (PIDs) employ a lamp to emit photons that ionize gases in the proximity of detector electrodes. An electric field is established between the plates of the electrodes by an applied voltage bias. The electric field induces ionized particles to move to one or another plate, thereby establishing an electric current between the electrodes. The electric current can be processed to provide an indication of the presence of one or more gasses. For example, PIDs may be used to detect the presence and/or concentration of volatile organic compounds (VOCs), which can pose a threat to human beings.

SUMMARY

In an embodiment, a photoionization detector may comprise an ultraviolet radiation source; one or more detector electrodes; one or more collection surfaces extending vertically from the detector electrodes configured to interact with ionized gases; and a shielding material located between the ultraviolet radiation source and the one or more detector electrodes, wherein the ultraviolet radiation does not directly impinge on at least a portion of the one or more detector electrodes.

In an embodiment, a method for gas detection may comprise exposing a photoionization detector to an environment containing a target gas, wherein the photoionization detector comprises; an ultraviolet radiation source configured to produce ultraviolet radiation; one or more detector electrodes; one or more collection surfaces extending vertically from the detector electrodes; and a shielding material located between the ultraviolet radiation source and the one or more detector electrodes; and shielding at least a portion of the one or more detector electrodes from direct impingement from the ultraviolet radiation via the shielding material.

In an embodiment, an electrode assembly for use with a photoionization detector, the electrode assembly may comprise a first electrode; a second electrode configured to interact with the first electrode to detect ionized gases; a first collection surface extending from the first electrode; a second collection surface extending from the second electrode; and a shielding material configured to shield at least the bottom portion of the first collection surface and at least the bottom portion of the second collection surface, wherein the shielding material is configured to reduce the ultraviolet radiation directly impinging on the first electrode and the second electrode.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for shielding detector electrodes within a photoionization detector from ultraviolet radiation. Some electrodes may comprise some shielding to prevent UV radiation from directly impinging on the electrodes and affecting the signal output from the electrodes. However, in some solutions, the side surfaces of the electrodes may be exposed to UV radiation, causing the electrodes to emit electrons and increasing the electronic noise in the output signal. Embodiments of the disclosure comprise a shielding material configured to increase the shielding of at least three sides of the detector electrodes in a PID.

Figure 1:
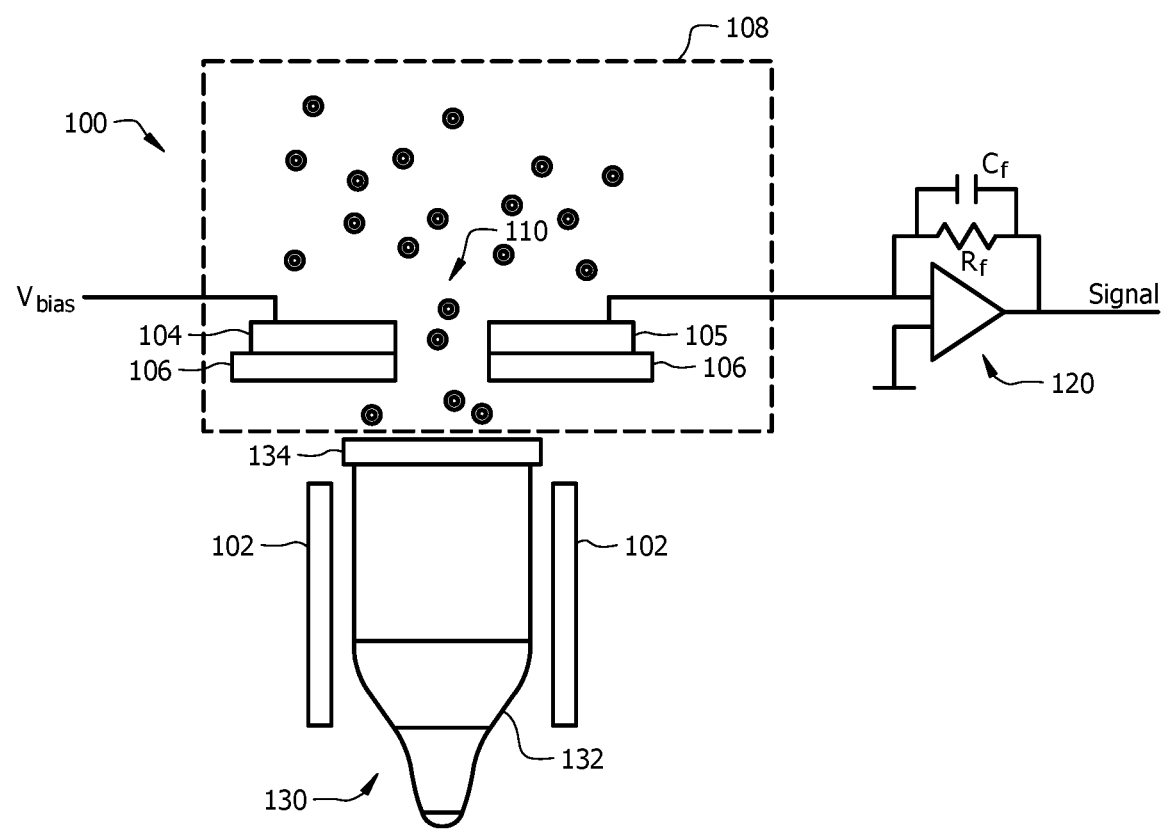
FIG. 1 illustrates a schematic drawing of a photoionization detector according to an embodiment.

Referring now to FIG. 1, an exemplary PID system 100 is shown. The PID system 100 may comprise a UV lamp 130 configured to act as a light source and generate light and/or radiation. In other embodiments, the PID system 100 may comprise another light source. While described as light, the radiation may or may not be in the visible spectrum. In general, the radiation can be selected to ionize one or more gasses of interest (e.g., target gas(es)) where the wavelength or wavelength range of the radiation may be suitable for ionizing the target gas(s). In some embodiments, the UV lamp 130 may be located proximate to one or more excitation electrodes 102.

The UV lamp 130 may function as a UV light source for the PID system 100. In some embodiments, the UV lamp 130 may produce vacuum ultraviolet (VUV) radiation. In some embodiments, the UV lamp 130 may comprise one or more noble gas sealed inside the sealed tube 132. UV light can be generated inside the UV lamp 130 by applying high voltage AC power via two excitation electrodes 102 located outside the UV lamp 130. The UV light generated inside the lamp 130 may pass through the crystal window 134 to the outside of the lamp 130.

The PID system 100 may be located proximate to the crystal window 134, and may comprise an ionization chamber 108. The ionization chamber 108 may comprise detector electrodes 104 and 105 inside the ionization chamber 108, configured to detect the ionization of the gas molecules 110 within the ionization chamber 108. In some embodiments, the detector electrodes 104 and 105 may comprise a shielding material 106 located between the electrodes 104 and 105 and the UV light source (or UV lamp 130).

The gas molecules 110 from the environment may enter the ionization chamber 108, the gas molecules 110 may absorb the energy of the UV light from the UV lamp 130, and then the gas molecules 110 may be ionized. The ionized particles can produce a current by their movements within the ionization chamber 108, which may be detected by the detector electrodes 104 and 105. A field may be applied between the detector electrodes 104 and 105. The ions formed by interaction with the light source may be drawn to the detector electrodes 104 and 105, thereby causing an electrical current to flow through the associated detector circuitry 120. Then the circuitry 120 will output a voltage signal, which will indicate concentration of one or more target gases in the ionization chamber 108.

Because of the shielding of the surfaces of the electrodes 104 and 105 from the UV radiation using the shielding material 106, the intensity of the UV radiation that is passed through the electrodes may be increased (i.e. increased from the intensity typically used), thereby increasing the output signal of the electrodes 104 and 105. The intensity may be increased by increasing the amount of UV radiation that is directed into the ionization chamber 108 via the crystal window 134. Increasing the intensity may also increase the UV luminous flux. Shielding the electrodes 104 and 106 via the shielding material 106 may decrease the noise in the output signal of the associated circuitry 120.

In some embodiments, the side surfaces of the electrodes 104 and 105 may also be shielded from the UV radiation. However, shielding the side surfaces of the electrodes 104 and 105 may change the electrical communication between the electrodes. To counteract any decrease in signal strength caused by the shielding material 106, other parameters of the circuitry 120 may be optimized.

For example, the feedback resistance ($R_f$), the feedback capacitance ($C_f$) and the bias voltage ($V_{bias}$) may be optimized to further reduce noise in the output signal. The signal-to-noise ratio (SNR) may be improved by adjusting the above parameters, thereby improving the resolution of the output signal.

Figure 2A:
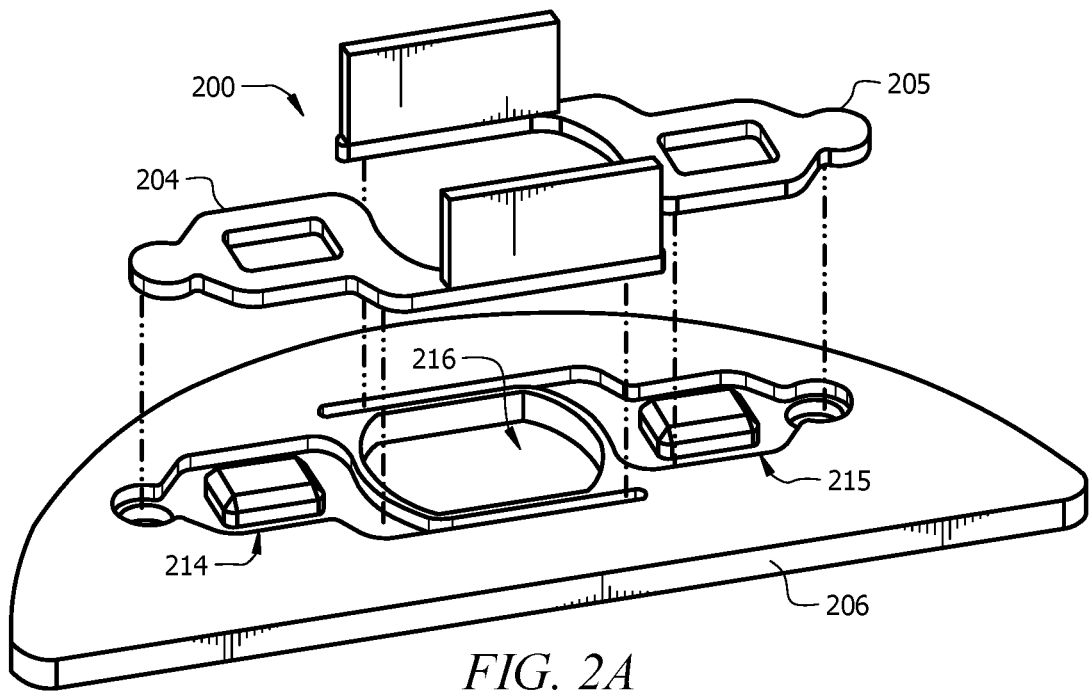
FIG. 2A illustrates an exploded view of an electrode assembly according to an embodiment.
Figure 2B:
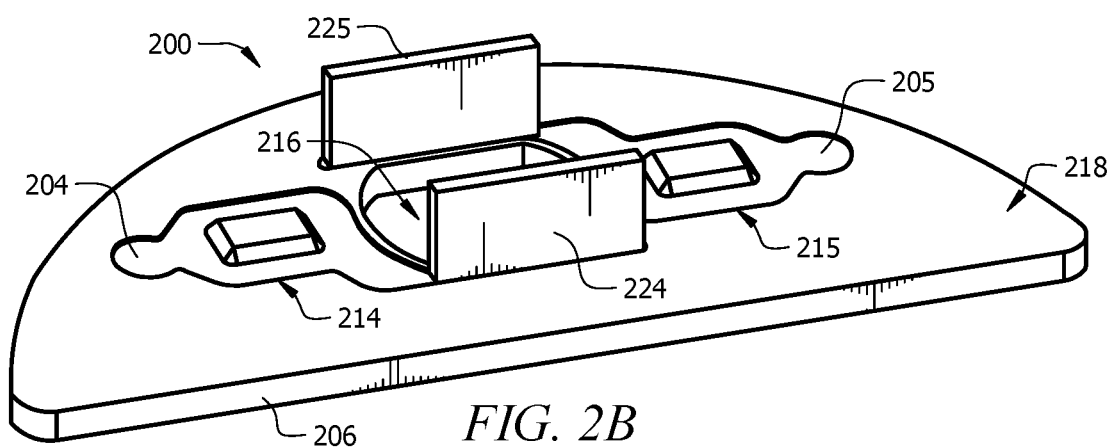
FIG. 2B illustrates a perspective view of an electrode assembly according to an embodiment.

Referring now to FIGS. 2A-2B, an exemplary embodiment of an electrode assembly 200 comprising electrodes 204 and 205 is shown. The electrodes 204 and 205 may be similar to the detector electrodes 104 and 105 described above. The electrodes may comprise a first electrode 204 and a second electrode 205. In some embodiments, the electrodes 204 and 205 may comprise a counter electrode and a sensing electrode.

As shown in FIGS. 2A-2B, the electrode assembly 200 may comprise a shielding material 206 which may be configured to attach to the electrodes 204 and 205. In some embodiments, the shielding material 206 may be similar to shielding material 106 described above. The shielding material 206 may be located between the electrodes 204 and 205 and a UV radiation source (as described above). In some embodiments, the shielding material 206 may comprise an opening 216 allowing air flow through the electrode assembly 200. In some embodiments, the shielding material 206 may comprise a first channel 214 configured to receive the first electrode 204. In some embodiments, the shielding material 206 may comprise a second channel 215 configured to receive the second electrode 205. In some embodiments, the electrodes 204 and 205 may comprise a collection surface 224 and 225, which may comprise an elongated section positioned adjacent to the opening 216. The collection surfaces 224 and 225 may be configured to collect ions from the ionized target gas as it passes through the opening 216.

As shown in FIG. 2B, when assembled, the shielding material 206 may be configured to cover at least three sides of the electrodes 204 and 205. In other words, the shielding material 206 may contact all surfaces of the electrodes 204 and 205 except for the top surface. Particularly, near the opening 216, the shielding material 206 may prevent UV light from impinging on the bottom surface and the two side surfaces of the electrodes 204 and 205. The top surface of the electrodes 204 and 205 may remain exposed to allow electrical communication between the electrodes 204 and 205. In some embodiment, the shielding material may comprise Teflon.

While the radiation may impinge on the collection surfaces 224 and 225, the angle of the incident radiation and the distance between the radiation source and the collection surfaces 224 and 225 may limit the interference effects of the radiation on the electrodes. Further, the increased collection area of the electrodes can provide an improved output from the sensor. Asa result, the improved shielding of the electrodes 204 and 205 provided by the shielding material may result in decreased noise levels in the output signal, higher sensitivity to target gases, higher resolution in readings, and/or improved stabilization and a smaller drift for the baseline of the PID.

Figure 3A:
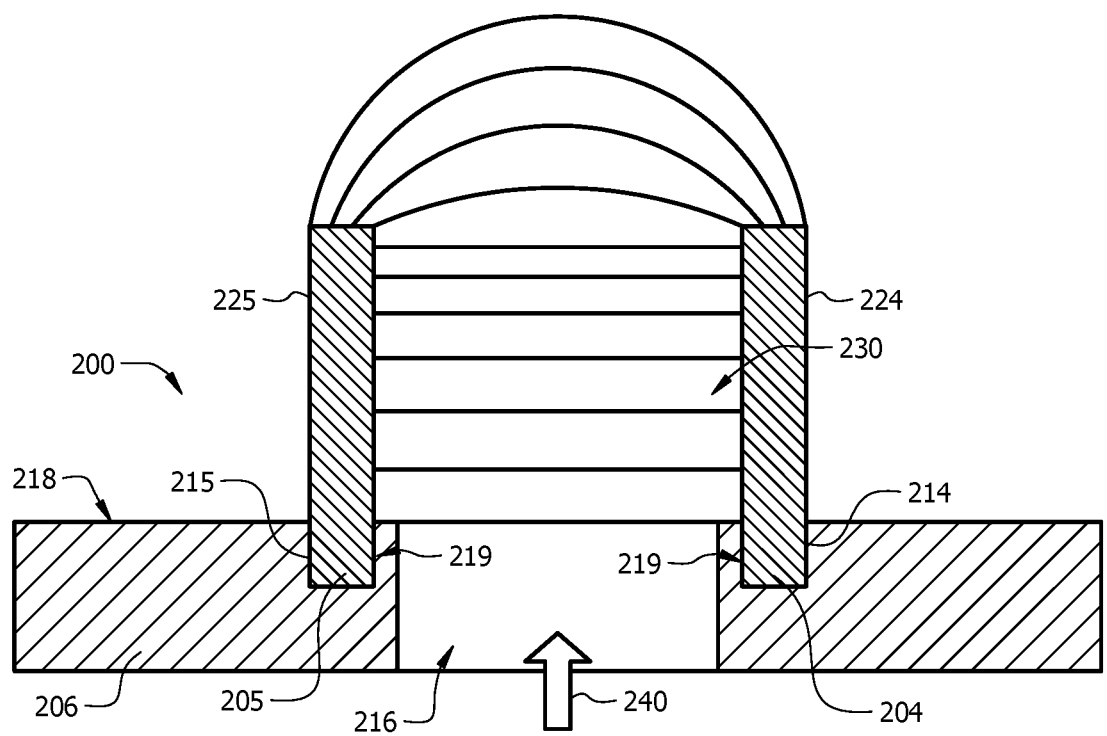
FIGS. 3A-3B illustrate cross-sectional views of an electrode assembly according to an embodiment.
Figure 3B:
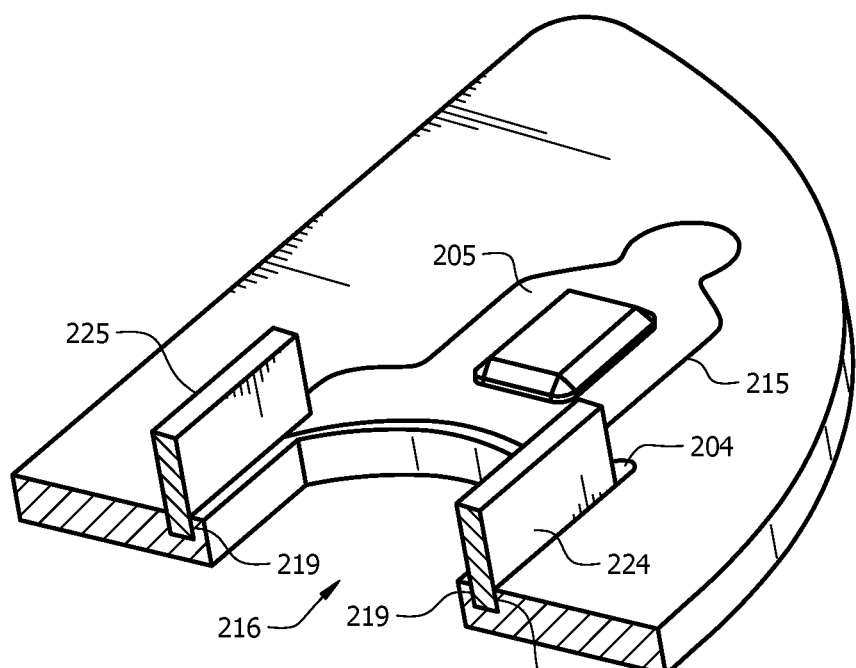

FIGS. 3A-3B illustrate a cross-sectional view of the electrode assembly 200. An example of a static electric field 230 between the two electrodes 204 and 205 is shown. UV light 240 from a light source may pass through the opening 216 of the shielding material 206, between the electrodes 204 and 205. The shielding material 206 may prevent the UV light 240 from impinging on any surfaces of the electrodes 204 and 205.

In some embodiments, the collection surfaces 224 and 225 may be configured to collect ions from the ionized target gas as it passes through the opening 216 and into the space covered by the static electric field 230. In some embodiments, the collection surfaces 224 and 225 may comprise walls extending vertically from the surface of the shielding material 206. The collection surfaces 224 and 225 may provide and increased surface area for the static electric field 230 to be formed, thereby increasing the interactions between the electrodes 204 and 205 and the target gases. By increasing the surface area of the collection surfaces 224 and 225, the intensity, accuracy, and clarity of the signal output from the electrodes 204 and 205 may be improved. In other words, increasing the surface area of the collection surfaces 224 and 225 may decrease the noise in the signal output from the electrodes 204 and 205.

As shown in FIGS. 2B-3B, the shielding material 206 may define a plane at the top surface 218 of the shielding material, where, when assembled, the electrodes 204 and 205 may be located at and below that plane, including the bottom portion of the collection surfaces 224 and 225. The shielding material 206 may comprise one or more "wall" portions 219 located between the opening 216 and the surface of the electrodes 204 and 205. The wall portions 219 may form a portion of the channels 214 and 215 configured to hold the electrodes 204 and 205. The wall portions 219 may extend upward and contact the bottom portion of the collection surfaces 224 and 225. However, the wall portions 219 may not contact the entire surface of the collection surfaces 224 and 225.

In some embodiments, the electrodes 204 and 205 may be spaced (across the opening 216) at least approximately 6 millimeters (mm) apart. In some embodiments, the collection surfaces 224 and 225 of the electrodes 204 and 205 may be spaced (across the opening 216) at least approximately 6 mm apart. In some embodiments, the electrodes 204 and 205 may be spaced between 2 mm and 10 mm apart. In some embodiments, the electrodes 204 and 205 may be spaced between 1 mm and 30 mm apart. In some embodiments, the collection surfaces 224 and 225 of the electrodes 204 and 205 may be spaced (across the opening 216) approximately 7.5 mm apart. In some embodiments, the collection surfaces 224 and 225 of the electrodes 204 and 205 may be spaced between 2 mm and 10 mm apart. In some embodiments, the collection surfaces 224 and 225 of the electrodes 204 and 205 may be spaced between 1 mm and 30 mm apart. In some embodiments, the opening 216 may comprise a width of approximately 7 mm. In some embodiments, the opening 216 may comprise a width of between 2 mm and 10 mm. In some embodiments, the opening 216 may comprise a width of between 1 mm and 30 mm.

In some embodiments, the surface area of the collection surface 224 (and/or collection surface 225) may be at least approximately 20 square mm. In some embodiments, the surface area of the collection surface 224 (and/or collection surface 225) may be at least approximately 30 square mm. In some embodiments, the surface area of the collection surface 224 (and/or collection surface 225) that is not covered by the shielding material 206 may be at least approximately 20 square mm. In some embodiments, the surface area of the collection surface 224 (and/or collection surface 225) may be between 5 square mm and 50 square mm. In some embodiments, the surface area of the collection surface 224 (and/or collection surface 225) may be between 1 square mm and 100 square mm.

Figure 4A:
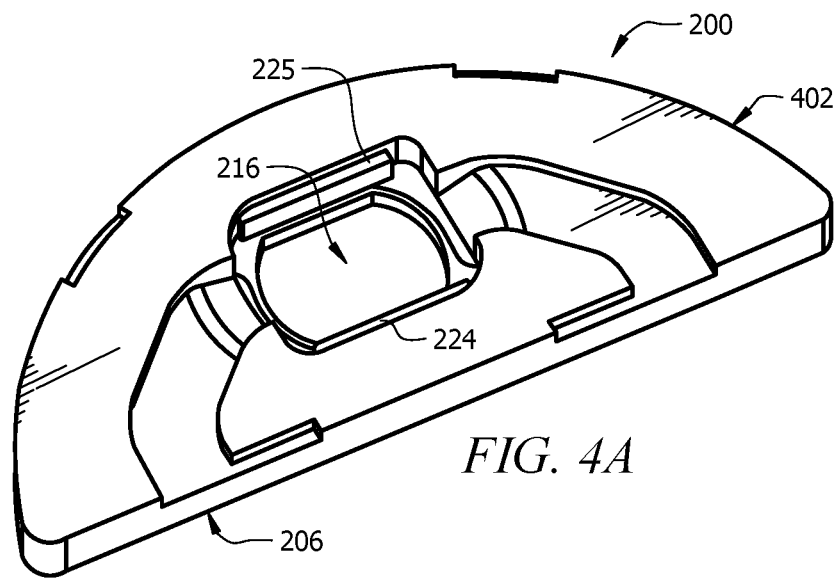
FIG. 4A-4B illustrate additional views of an electrode assembly according to an embodiment.
Figure 4B:
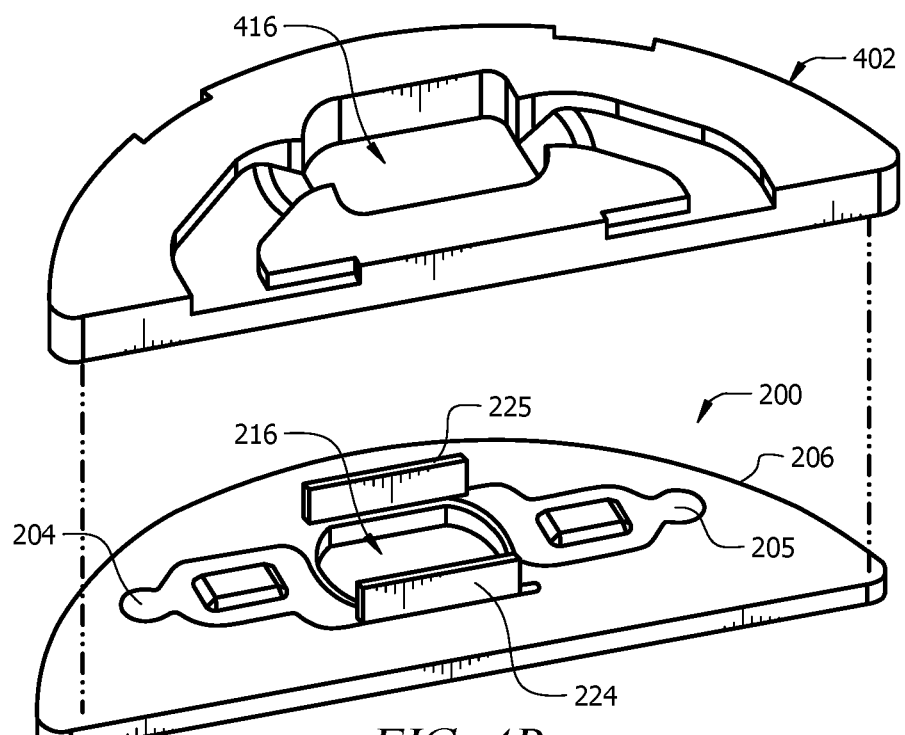

Referring to FIGS. 4A-4B, the electrode assembly 200 may be further assembled with one or more housing element 402. The housing element 402 may protect the electrode assembly 200 and allow a user to handle the electrode assembly 200 without damage to the assembly 200 and/or injury to the user. The housing element 402 may also function as a gas path for directing airflow through the electrode assembly. The housing element 402 may also provide electrical insulation.

Figure 5:
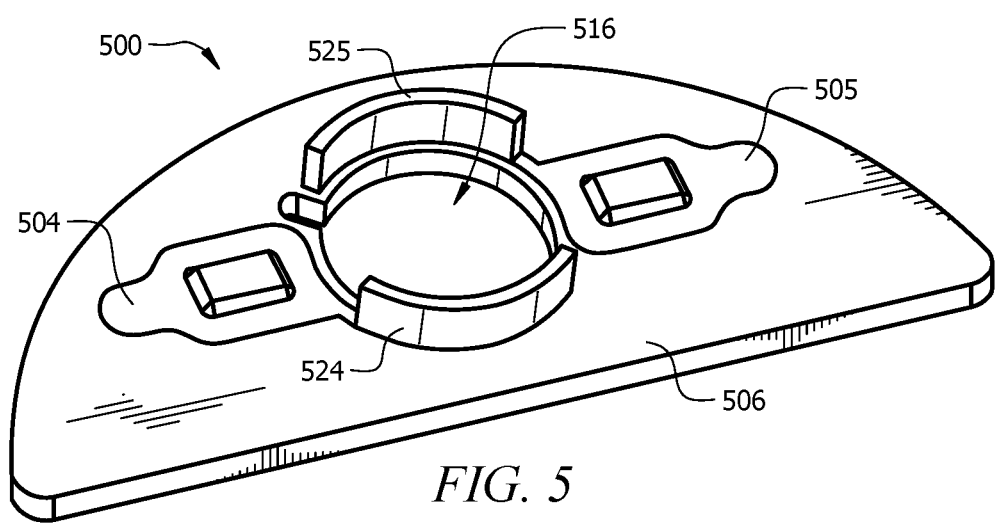
FIG. 5 illustrates another perspective view of an electrode assembly according to an embodiment.

FIG. 5 illustrates an additional embodiment of an electrode assembly 500, which may be similar to the electrode assembly 200 described above. The electrode assembly 500 may comprise two electrodes 504 and 505 comprising collection surfaces 525 and 524. The electrode assembly 500 may comprise a shielding material 506 configured to fit around at least a portion of the electrodes 504 and 505. The shielding material 506 may comprise an opening 516 allowing airflow through the electrode assembly 500. In the embodiment of FIG. 5, the collection surfaces 524 and 525 may comprise a rounded or semi-circular shape. Additionally, the opening 516 may comprise a rounded or circular shape that is similar to the shape of the collection surfaces 524 and 525.

The electrodes assemblies 200 and 500 described above may comprise rectangular collection surfaces, and rounded collection surfaces. Additionally, electrode assemblies may comprise collection surfaces with various shapes, wherein the shielding material may be configured to fit around at least a portion of the electrodes of various shapes.

Having described various devices and methods herein, exemplary embodiments or aspects can include, but are not limited to:

In a first embodiment, a photoionization detector may comprise an ultraviolet radiation source; one or more detector electrodes; one or more collection surfaces extending vertically from the detector electrodes configured to interact with ionized gases; and a shielding material located between the ultraviolet radiation source and the one or more detector electrodes, wherein the ultraviolet radiation does not directly impinge on at least a portion of the one or more detector electrodes.

A second embodiment can include the photoionization detector of the first embodiment, wherein the shielding material is configured to contact at least three sides of the one or more detector electrodes.

A third embodiment can include the photoionization detector of the first or second embodiments, wherein the shielding material comprises one or more channels, and wherein the one or more detector electrodes are configured to fit within the one or more channels.

A fourth embodiment can include the photoionization detector of any of the first to third embodiments, wherein a top surface of the shielding material defines a plane, and wherein a portion of the one or more collection surfaces are located at or below the defined plane.

A fifth embodiment can include the photoionization detector of any of the first to fourth embodiments, wherein the shielding material comprises Teflon.

A sixth embodiment can include the photoionization detector of any of the first to fifth embodiments, wherein the one or more detector electrodes comprise a counter electrode and a sensing electrode.

A seventh embodiment can include photoionization detector of any of the first to sixth embodiments, wherein the one or more collection surfaces comprise a surface area of at least 20 square millimeters.

An eighth embodiment can include the photoionization detector of any of the first to seventh embodiments, wherein the shielding material comprises a wall portion extending along at least a portion of the height of the collection surface of the one or more electrodes.

A ninth embodiment can include the photoionization detector of any of the first to eighth embodiments, wherein the shielding material comprises an opening configured to allow a target gas to pass between the detector electrodes, and wherein at least a portion of the shielding material is located between the opening and the detector electrodes.

In a tenth embodiment, a method for gas detection may comprise exposing a photoionization detector to an environment containing a target gas, wherein the photoionization detector comprises; an ultraviolet radiation source configured to produce ultraviolet radiation; one or more detector electrodes; one or more collection surfaces extending vertically from the detector electrodes; and a shielding material located between the ultraviolet radiation source and the one or more detector electrodes; and shielding at least a portion of the one or more detector electrodes from direct impingement from the ultraviolet radiation via the shielding material.

An eleventh embodiment can include the method of the tenth embodiment, further comprising ionizing the target gas using the ultraviolet radiation; detecting, by the one or more collection surfaces, the electric current produced by the ionization; and determining the concentration of the sample gas based on the detected electric current.

A twelfth embodiment can include the method of the tenth to eleventh embodiments, further comprising forming a static electric field between the collection surfaces across an opening of the shielding material.

A thirteenth embodiment can include the method of any of the tenth or twelfth embodiments, wherein the collection surfaces comprise a surface area that is not covered by the shielding material of at least 20 square millimeters.

A fourteenth embodiment can include the method of any of the tenth to thirteenth embodiments, further comprising passing the target gas through an opening in the shielding material, between the detector electrodes, and wherein shielding comprises providing shielding material between the opening and a portion of the collection surfaces.

A fifteenth embodiment can include the method of any of the tenth to fourteenth embodiments, wherein shielding comprises covering at least a portion of the collection surfaces of the detector electrodes.

In a sixteenth embodiment, an electrode assembly for use with a photoionization detector, the electrode assembly may comprise a first electrode; a second electrode configured to interact with the first electrode to detect ionized gases; a first collection surface extending from the first electrode; a second collection surface extending from the second electrode; and a shielding material configured to shield at least the bottom portion of the first collection surface and at least the bottom portion of the second collection surface, wherein the shielding material is configured to reduce the ultraviolet radiation directly impinging on the first electrode and the second electrode.

A seventeenth embodiment can include the electrode assembly of the sixteenth embodiment, further comprising a housing configured to contain and protect the first and second electrodes.

An eighteenth embodiment can include the electrode assembly of the sixteenth or seventeenth embodiments, wherein the shielding material is located between an ultraviolet radiation source and the first and second electrodes.

A nineteenth embodiment can include the electrode assembly of any of the sixteenth to eighteenth embodiments, wherein the shielding material comprises an opening configured to allow a target gas to pass between the first and second collection surfaces, and wherein at least a portion of the shielding material is located between the opening and the first and second collection surfaces.

A twentieth embodiment can include the electrode assembly of any of the sixteenth to eighteenth embodiments, wherein the first collection surface comprises a surface area of at least 20 square millimeters, and wherein the second collection surface comprises a surface area of at least 20 square millimeters.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A photoionization detector comprising:
an ultraviolet radiation source;
one or more detector electrodes;
one or more collection surfaces extending vertically from the one or more detector electrodes configured to interact with ionized gases;
a shielding material located between the ultraviolet radiation source and the one or more detector electrodes, wherein the ultraviolet radiation source does not directly impinge on at least a portion of the one or more detector electrodes; and
a detector circuitry configured to reduce noise in an output signal from the one or more detector electrodes.

2. The photoionization detector of claim 1, wherein the shielding material is configured to contact at least three sides of the one or more detector electrodes.

3. The photoionization detector of claim 1, wherein the shielding material comprises one or more channels, and wherein the one or more detector electrodes are configured to fit within the one or more channels.

4. The photoionization detector of claim 1, wherein a top surface of the shielding material defines a plane, and wherein a portion of the one or more collection surfaces are located at or below the plane.

5. The photoionization detector of claim 1, wherein the shielding material comprises Teflon.

6. The photoionization detector of claim 1, wherein the one or more detector electrodes comprise a counter electrode and a sensing electrode.

7. The photoionization detector of claim 1, wherein the one or more collection surfaces comprise a surface area of at least 20 square millimeters.

8. The photoionization detector of claim 1, wherein the shielding material comprises a wall portion extending along at least a portion of height of the collection surfaces of the one or more electrodes.

9. The photoionization detector of claim 1, wherein the shielding material comprises an opening configured to allow a target gas to pass between the one or more detector electrodes, and wherein at least a portion of the shielding material is located between the opening and the one or more detector electrodes.

10. A method for gas detection comprising:
exposing a photoionization detector to an environment containing a target gas, wherein the photoionization detector comprises;
an ultraviolet radiation source configured to produce ultraviolet radiation;
one or more detector electrodes;
one or more collection surfaces extending vertically from the detector electrodes; and
a shielding material located between the ultraviolet radiation source and the one or more detector electrodes;
a detector circuitry configured to reduce noise in an output signal from the one or more detector electrodes; and
shielding at least a portion of the one or more detector electrodes from direct impingement from the ultraviolet radiation via the shielding material.

11. The method of claim 10, further comprising:
ionizing the target gas using the ultraviolet radiation;
detecting, by the one or more collection surfaces, electric current produced by the ionization; and
determining a concentration of a sample gas based on the electric current.

12. The method of claim 10, further comprising forming a static electric field between the collection surfaces across an opening of the shielding material.

13. The method of claim 10, wherein the collection surfaces comprise a surface area that is not covered by the shielding material of at least 20 square millimeters.

14. The method of claim 10, further comprising passing the target gas through an opening in the shielding material, between the detector electrodes, and wherein shielding comprises providing the shielding material between the opening and a portion of the collection surfaces.

15. The method of claim 10, wherein shielding comprises covering at least a portion of the one or more collection surfaces of the detector electrodes.

* * * * *